United States Patent
Soph

(10) Patent No.: US 7,908,359 B1
(45) Date of Patent: Mar. 15, 2011

(54) METHOD AND APPARATUS FOR MAINTAINING STATUS OF A CUSTOMER CONNECTIVITY

(75) Inventor: Russell Soph, Canton, GA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 428 days.

(21) Appl. No.: 11/753,242

(22) Filed: May 24, 2007

(51) Int. Cl.
*G06F 15/173* (2006.01)

(52) U.S. Cl. ........ 709/224; 709/203; 709/223; 709/238; 370/401

(58) Field of Classification Search .......... 709/223–224, 709/202–203, 238; 370/400–401
See application file for complete search history.

(56) References Cited

U.S. PATENT DOCUMENTS

| | | | |
|---|---|---|---|
| 6,173,324 B1 * | 1/2001 | D'Souza | 709/224 |
| 6,631,409 B1 * | 10/2003 | Watson et al. | 709/224 |
| 6,952,729 B2 * | 10/2005 | Bialk et al. | 709/224 |
| 7,290,037 B2 * | 10/2007 | Clark et al. | 709/224 |
| 7,337,222 B1 * | 2/2008 | Du et al. | 709/223 |
| 7,389,345 B1 * | 6/2008 | Adams | 709/224 |
| 7,804,766 B2 * | 9/2010 | Qian et al. | 370/216 |
| 2004/0031059 A1 * | 2/2004 | Bialk et al. | 709/220 |
| 2004/0111471 A1 * | 6/2004 | Stoner et al. | 709/204 |
| 2006/0114838 A1 * | 6/2006 | Mandavilli et al. | 370/401 |
| 2010/0085920 A1 * | 4/2010 | Chari et al. | 370/401 |

* cited by examiner

*Primary Examiner* — Bharat N Barot

(57) ABSTRACT

A method and apparatus for maintaining a status of a customer connectivity are disclosed. For example, the method monitors one or more network components for one or more network alarms, wherein at least one customer connectivity is supported by the one or more network components. The method receives a network alarm for the one or more network components and correlates the network alarm with the at least one customer connectivity that is affected by the network alarm. The method then updates a status of the at least one customer connectivity that is affected by the network alarm.

18 Claims, 4 Drawing Sheets

METHOD AND APPARATUS FOR MAINTAINING STATUS OF A CUSTOMER CONNECTIVITY

The present invention relates generally to communication networks and, more particularly, to a method and apparatus for providing a view of customer connectivity over networks such as the Internet Protocol (IP) networks, Asynchronous Transfer Mode (ATM) networks, Frame Relay (FR) networks, etc.

BACKGROUND OF THE INVENTION

An enterprise customer may build a Virtual Private Network (VPN) by connecting multiple sites or users over a network from a telephony service provider. The enterprise VPN may be built using multiple types of access networks connecting the various customer sites and users to a service provider's network. The access is provided to each site over various layers of transport network protocol. For example, a VPN may use Layer 3 Internet protocol, Layer 2 protocols (e.g., frame relay/ATM PVC, Digital Subscriber Line (DSL), etc.), Layer 1 protocols (e.g., Synchronous Optical Networks (SONET), Ethernet, ATM, etc.) and a physical layer. Each transport layer is monitored by the network service provider using different alarm monitoring systems, designed for the specific layer. However, a network trouble, e.g., congestion, failure, etc., at any layer may have a common result/impact from the customer's perspective. For example, the customer may experience service degradation, or a service failure on his/her VPN connectivity. Often, the customer may not be able to determine the cause of the service degradation or failure. For example, if a service provider notifies a customer that a network trouble is detected, the customer may still be unable to determine whether or not a particular connectivity is affected by the reported network trouble. As the number of types of access networks increases, correlating the various types of alarms and presenting status to customers becomes a challenge.

SUMMARY OF THE INVENTION

In one embodiment, the present invention discloses a method and apparatus for maintaining a status of a customer connectivity. For example, the method monitors one or more network components for one or more network alarms, wherein at least one customer connectivity is supported by the one or more network components. The method receives a network alarm for the one or more network components and correlates the network alarm with the at least one customer connectivity that is affected by the network alarm. The method then updates a status of the at least one customer connectivity that is affected by the network alarm.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing a view of customer connectivity over networks such as Internet Protocol networks, Asynchronous Transfer Mode (ATM) networks, Frame Relay (FR) networks, etc. Although the present invention is discussed below in the context of packet networks, the present invention is not so limited. Namely, the present invention can be applied for other networks, e.g., Public Switched Telephone Network (PSTN).

Figure 1:
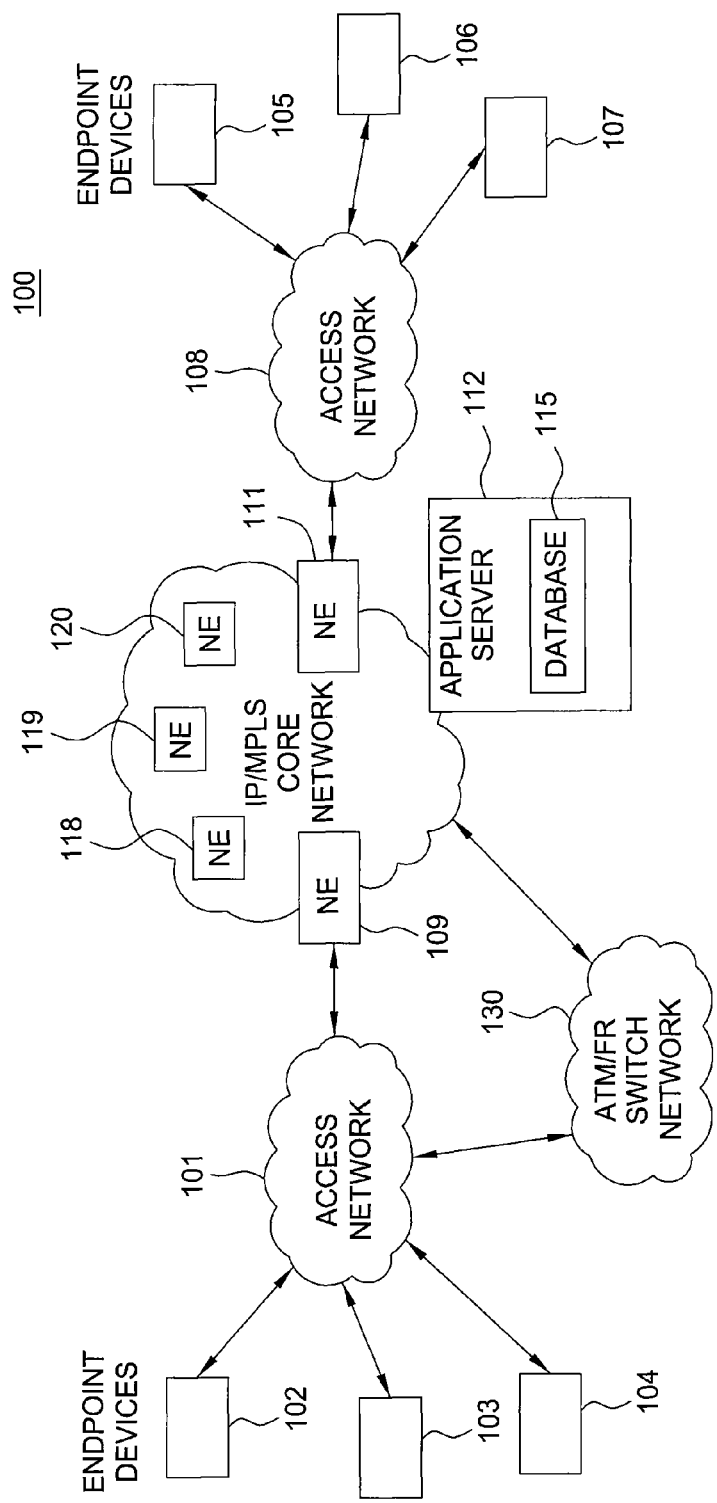
FIG. 1 illustrates an exemplary network related to the present invention.

FIG. 1 is a block diagram depicting an exemplary packet network 100 related to the current invention. Exemplary packet networks may include Internet protocol (IP) networks, Asynchronous Transfer Mode (ATM) networks, frame-relay networks, and the like. An IP network is broadly defined as a network that uses Internet Protocol such as IPv4 or IPv6 to exchange data packets.

In one embodiment, the packet network may comprise a plurality of endpoint devices 102-104 configured for communication with a core packet network 110 (e.g., an IP based core backbone network supported by a service provider, e.g., an IP/Multiprotocol Label Switching (MPLS) core network) via an access network 101. Similarly, a plurality of endpoint devices 105-107 are configured for communication with the core packet network 110 via an access network 108. The network elements 109 and 111 may serve as gateway servers or edge routers for the core packet network 110.

In one embodiment, the endpoint devices 102-107 may comprise customer endpoint devices such as personal computers, laptop computers, Personal Digital Assistants (PDAs), servers, routers, and the like. The access networks 101 and 108 serve as a communication medium to establish a connection between the endpoint devices 102-107 and the NEs 109 and 111 of the IP/MPLS core network 110. The access networks 101 and 108 may each comprise a Digital Subscriber Line (DSL) network, a broadband cable access network, a Local Area Network (LAN), a Wireless Access Network (WAN), and the like.

The access networks 101 and 108 may be either directly connected to NEs 109 and 111 of the IP/MPLS core network 110 or through an Asynchronous Transfer Mode (ATM) and/or Frame Relay (FR) switch network 130. If the connection is through the ATM/FR network 130, the packets from customer endpoint devices 102-104 (traveling towards the IP/MPLS core network 110) traverse the access network 101 and the ATM/FR switch network 130 and reach the border element 109.

In one embodiment, the ATM/FR network 130 contains Layer 2 switches functioning as Provider Edge Routers (PERs) and/or Provider Routers (PRs). The Layer 2 switches may be interconnected over Synchronous Optical Network (SONET), e.g., ATM/SONET. The PERs may also contain an additional Route Processing Module (RPM) that converts Layer 2 frames to Layer 3 Internet Protocol (IP) frames. An RPM enables the transfer of packets from a Layer 2 Permanent Virtual Circuit (PVC) to an IP network which is connectionless.

Some NEs (e.g., NEs 109 and 111) reside at the edge of the core infrastructure and interface with customer endpoints over various types of access networks. An NE that resides at the edge of a core infrastructure is typically implemented as an edge router, a media gateway, a border element, a firewall, a switch, and the like. An NE may also reside within the network (e.g., NEs 118-120) and may be used as a mail server, honeypot, a router, or like device. The IP/MPLS core network 110 also comprises an application server 112 that contains a database 115. The application server 112 may comprise any server or computer that is well known in the art, and the database 115 may be any type of electronic collection of data that is also well known in the art. Those skilled in the art will realize that although only six endpoint devices, two access networks are depicted in FIG. 1, the communication system 100 may be expanded by including additional endpoint devices, access networks, border elements, etc. without altering the present invention.

The above IP network is described to provide an illustrative environment in which packets for voice and data services are transmitted on networks. An enterprise customer may build a Virtual Private Network (VPN) by connecting multiple sites or users over a network from a telephony service provider. For example, a Customer Edge Router (CER) located at the customer premise may be connected to the network service provider's Layer 2 network through a Provider Edge Router (PER). For example, a VPN site for a customer may have a CER connected to a PER in the service provider's Layer 2 network. For example, the Layer 2 network may be an Asynchronous Transfer Mode (ATM) and/or Frame Relay (FR) network. The customer traffic is then transmitted to the IP/MPLS core network through an ATM/FR switch network. The ATM/FR switch (attached to the IP/MPLS core network) converts the packets from Layer 2 ATM/FR cells to IP packets and forwards the IP packets towards a border element for the IP/MPLS core network. A Permanent Virtual Circuit (PVC) may be established over one or more trunks in the ATM/FR network and may be used for enabling traffic to traverse the ATM/FR network from one switch to another.

A VPN may allow a variety of combinations of Layer 1 and Layer 2 protocol options. For example, Layer 1 protocol options may include FR, ATM, SONET and Ethernet protocols. Layer 2 protocol options may include FR, ATM, DSL, PVC, etc. The service provider may implement alarm monitoring systems at the various layers of the network. Alarms, tickets, and status are created for each layer based on its own alarm points. However, a network trouble, e.g., congestion, failure, etc., at any layer may end in a common result from a customer's perspective. For example, the customer may simply experience a service degradation or a failure, regardless of which network layer is actually being impacted by the network trouble. Furthermore, as the number of types of access networks increases, correlating the various types of alarms and presenting status to customers becomes a challenge.

In one embodiment, the current invention provides a view of the customer connectivity. The method first creates one or more connectivities between customer edge routers and provider edge routers. These connectivities are also known as Internet Protocol-Permanent Virtual Circuits (IP-PVC). For example, the service provider may create connectivity for a customer VPN site over one or more transport networks or network components. The connectivity includes all transport layer components for obtaining access to service. For example, the connectivity may include the IP layer (Layer 3), any Layer 2 PVCs that may be built for transporting customer traffic between the customer edge router and provider edge router. For example, a Layer 2 PVC may be used for transporting through a $3^{rd}$ party access provider network. The connectivity is transport and/or protocol agnostic. For example, the connectivity may be used through a third party transport network provider, directly over a customer Local Area Network (LAN), and so on. In one embodiment, the customer may access the PER for the IP/MPLS network of the service provider without traversing through a Layer 2 switch network. In another embodiment, the customer edge router may be connected to the service provider's IP/MPLS network through a Layer 2 network (e.g., an ATM/FR switch network).

In one embodiment, the service provider may monitor the various transport layers between the customer edge router/device and provider edge router/device for network events. The service provider may summarize the network events from the various sources, and correlate the network events to customer connectivities that may be impacted by the network events.

In one embodiment, the service provider enables the customer to access and view his/her connectivities and associated status. For example, a customer may use a web browser to access one or more maps/displays of one or more VPN networks and connectivities by entering the proper identification(s). For example, a VPN may have several connectivities. Each connectivity may have a unique identification such as a site number or a location name. The customer may then access a network resource, enter the appropriate identification, and view the status of his/her connectivities.

In one embodiment, the service provider can quickly display the status of one or more connectivities to the customer. More specifically, the present invention creates a single object for viewing customer connectivities that enables tracking of status from the customer perspective.

In one embodiment, the service provider may provide several options as to how connectivity status can be presented. For example, the service provider may provide the connectivity status on a per VPN basis. Alternatively, the service provider may provide the connectivity status on a customer edge device to provider edge device pair basis. In another embodiment, the service provider may provide the connectivity status on a per location basis.

In one embodiment, the service provider enables a customer to selectively configure a preference for obtaining the connectivity status. For example, a customer may choose to obtain one combined status for all sites while another customer may choose to obtain status for each provider edge device to customer edge device pair, and so on.

Figure 2:
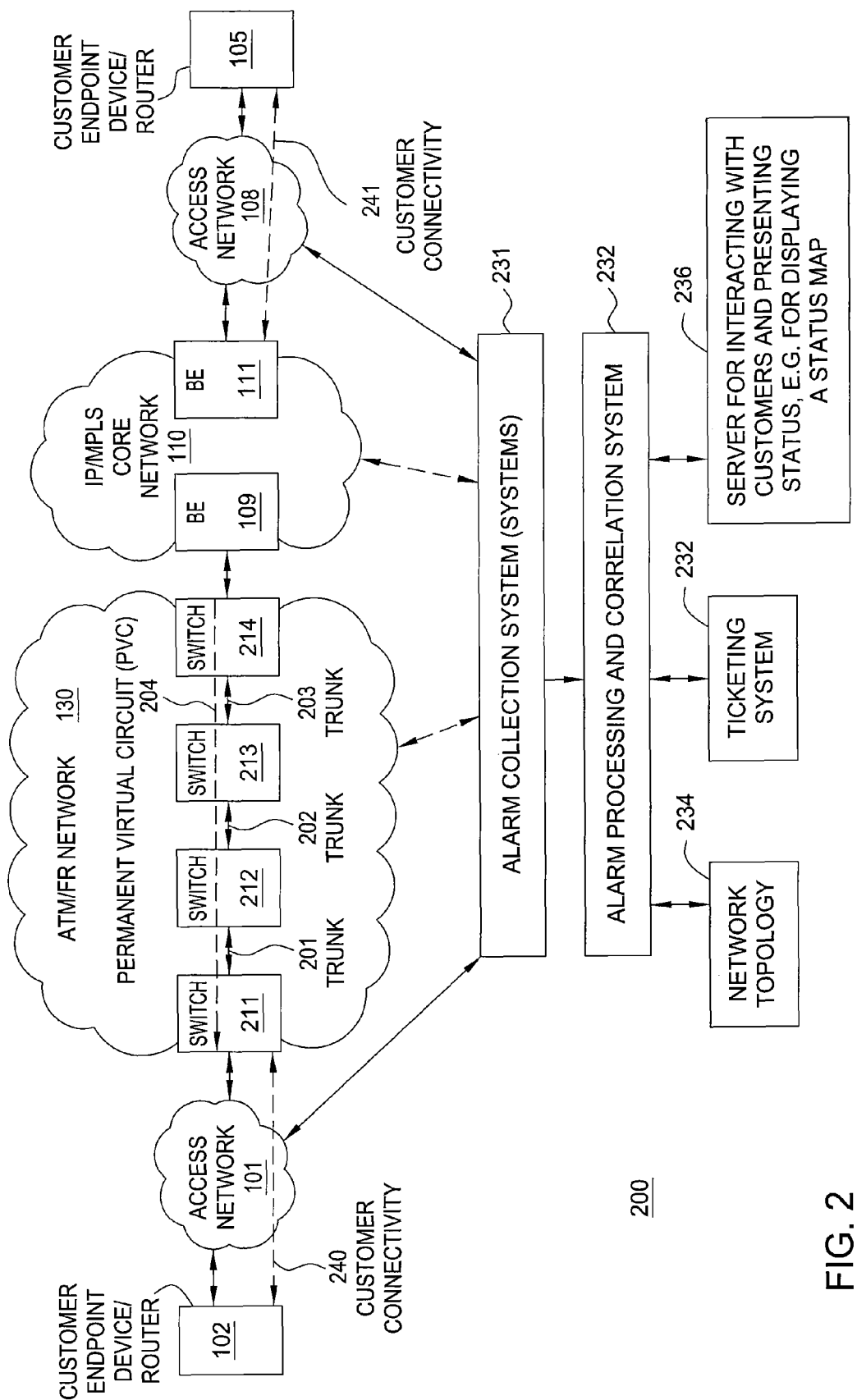
FIG. 2 illustrates an exemplary network with the current invention for providing a view of the customer connectivity.

FIG. 2 illustrates an exemplary network 200 with the current invention for providing a view of the customer connectivity. For example, a customer endpoint device 102 is in communication with a customer endpoint device 105. Traffic from the customer endpoint device 102 to the customer endpoint device 105 traverses the access network 101, the ATM/FR network 130, the IP/MPLS core network 110, and the access network 108. Similarly, traffic from the customer endpoint device 105 to the endpoint device 102 traverses the access network 108, the IP/MPLS core network 110, the ATM/FR network 130, and the access network 101.

In one embodiment, the ATM/FR network 130 may contain ATM/FR switches 211-214. The ATM/FR switch 211 is functioning as a PER for the ATM/FR network 130 for packets originated by customer endpoint device 102. Trunk 201 connects ATM/FR switches 211 and 212. Trunk 202 connects ATM/FR switches 212 and 213. Trunk 203 connects ATM/FR switches 213 and 214. The ATM/FR switch 214 is connected to the IP/MPLS core network 110 through a border element 109. In one embodiment, a Permanent Virtual Circuit 204 is established connecting ATM/FR switches 211 and 214 over trunks 201, 202 and 203 for transporting packets between customer endpoint devices 102 and 105. As such, traffic between customer endpoint devices 102 and 105 traverses the ATM/FR network 130 using the permanent virtual circuit 204.

In one embodiment, a customer connectivity 240 is established connecting customer endpoint device 102 to ATM/FR switch 211 over access network 101. Similarly, a customer connectivity 241 is established connecting customer endpoint device 105 to BE 111 over access network 108. The endpoint device 102 is connected to an ATM/FR switch 211 located in the ATM/FR network 130 through access network 101 over the customer connectivity 240. The endpoint device 105 is connected to the Border Element (BE) 111 located in IP/MPLS core network 110 through access network 108 over the customer connectivity 241. Customer connectivities 240 and 241 may contain various transport Layer networks and network components, e.g., Layer 1, Layer 2 and Layer 3 networks.

In one embodiment, an alarm collection system 231 is connected to access networks 101 and 108. In another embodiment, the alarm collection system 231 is also connected to the ATM/FR network 130 and the IP/MPLS core network 110. In yet another embodiment, the alarm collection system 231 may be connected to various network element management systems (not shown) that gather alarms for various networks and network components.

The alarm collection system 231 is connected to an alarm processing and correlation system 232. The alarm processing and correlation system 232 is also connected to a ticketing system 233, a network topology system 234, and an application server 236 for interacting with customers and presenting connectivity status. As an example, the service provider may store the network topology including association(s) of customer connectivities, access networks, PVCs used for traversing through access networks in the network topology system 234. When the alarm collection system 231 receives an alarm for a network or a network component, the alarm is forwarded to the alarm processing and correlation system 232. The alarm correlation system 232 uses the received alarm and network topology 234 to identify one or more affected customer connectivities. The affected customer connectivities are then stored for later retrieval in response to a customer query for status of the customer connectivities.

The present invention allows a customer to query the status of the customer connectivities. For example, customers may query the application server 236 to retrieve the status of their own connectivities. The application server 236 may access the status of customer connectivities from the alarm processing and correlation system 232 and present the status to the customers or other users. For example, a graphical or electronic map of the current status of the customer connectivities may be displayed to the customer, e.g., viewed on a display or a monitor. It should be noted that the customer connectivities may include the end-to-end IP layer as well as any Layer 2 PVCs that are required to complete a connection. As such, the customer connectivities may include all network components that are used to provide end-to-end access. As such, the present invention allows a customer to be presented with a comprehensive view of their access inventory (e.g., all end-to-end transport layers) and its status.

In one embodiment, the status of the customer connectivities can be accessed on a customer homepage. For example, a service provider can proactively update the information on the customer homepage based on the alarms that are continuously correlated to the customer connectivities. As such, new alarms and/or resolutions of network trouble tickets or failures affecting the customer connectivities can be dynamically reported to the customer. The customer can easily view the pertinent portion of the network and obtain the underlying details by pointing and clicking on the graphical map.

Figure 3:
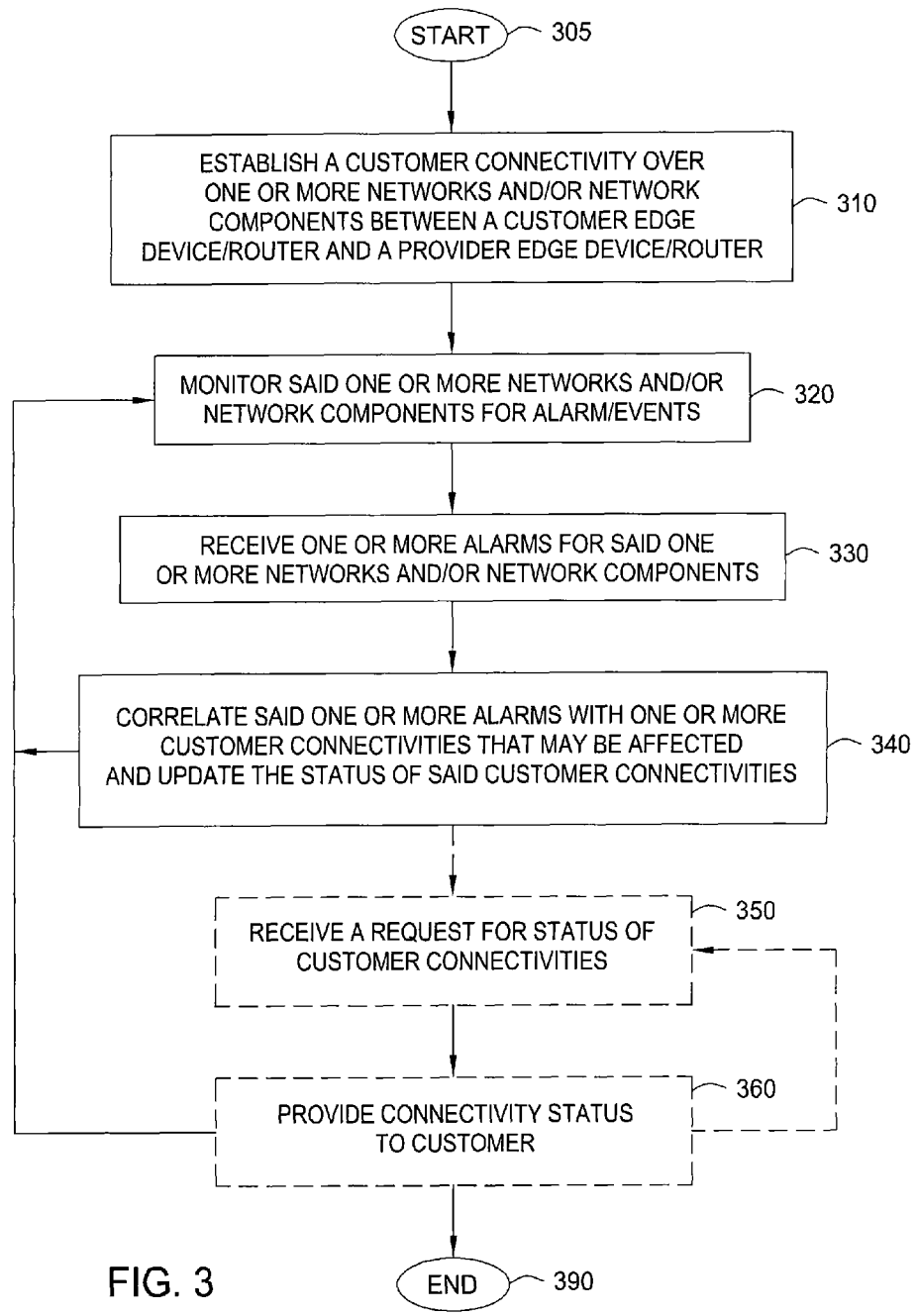
FIG. 3 illustrates a flowchart of a method for providing a view of customer connectivity.

FIG. 3 illustrates a flowchart of a method 300 for providing a view of customer connectivities. Method 300 starts in step 305 and proceeds to step 310.

In step 310, method 300 establishes a customer connectivity over one or more networks and/or network components between a customer edge device and a provider edge device. For example, the service provider receives a service request for establishing a connection between two customer VPN locations. The service provider then creates a connectivity for each location by connecting the customer edge router for the VPN to a provider's edge router over an access network, e.g., a DSL network.

In step 320, method 300 monitors the one or more networks and/or network components for alarms/events. For the above example, the method collects alarms and event notifications for the DSL network and/or other network components through an alarm collection/monitoring system.

In step 330, method 300 receives one or more alarms for the one or more networks and/or network components. For example, a collection system may receive an alarm for an access network failure. The alarm may be gathered for each transport layer separately.

In step 340, method 300 correlates the one or more alarms with one or more customer connectivities that may be affected, and updates the status of the customer connectivities. For example, an alarm processing and correlation system may retrieve the network topology for all customers, and identify pertinent customer connectivities that may be affected by the alarm. For example, an enterprise customer may have multiple customer connectivities interconnecting virtual private network sites. The alarm may affect only one of the customer connectivities belonging to the enterprise customer. The method then identifies which customer connectivities are affected and updates the status accordingly. The method may proceed back to step 320 to continue monitoring the network, or continues to optional step 350.

In optional step 350, method 300 may receive a request for the status of customer connectivities. For the above example, an application server may receive a request from a customer to display the current status for a particular VPN, for a particular location, for a particular connectivity and so on. The application server then may send a status query to the alarm processing and correlation system.

In optional step 360, method 300 provides the connectivity status to the customer. For the above example, the alarm processing and correlation system may send a response to the status query to an application server that interacts with the customer. The application server may present the status information to the customer in a graphical map format or in a simple text format. The method may proceed back to step 320 to continue monitoring the network, to optional step 350 to continue receiving status queries, or to end in step 390.

It should be noted that although not specifically specified, one or more steps of method 300 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIG. 3 that recite a determining operation or involve a decision, do not necessarily require that both branches of the determining operation be practiced. In other words, one of the branches of the determining operation can be deemed as an optional step.

Figure 4:
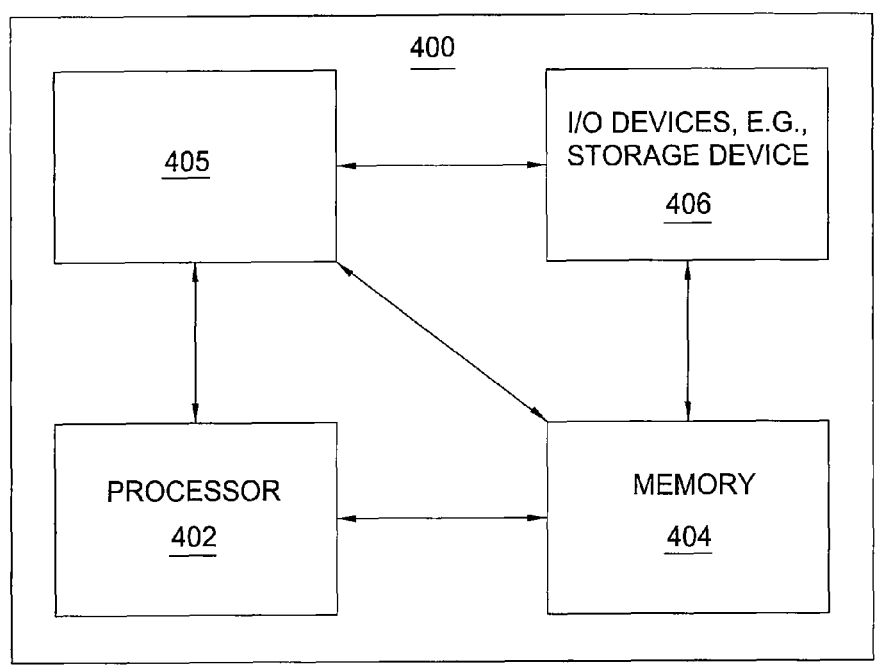
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing a view of a customer connectivity, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for providing a view of a customer connectivity can be loaded into memory 404 and executed by processor 402 to implement the functions as discussed above. As such, the present method 405 for providing a view of a customer connectivity (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for maintaining a status of a customer connectivity, comprising:
    monitoring a plurality of network components, wherein a customer connectivity is supported by the plurality of network components;
    receiving a network alarm for a network component of the plurality of network components;
    correlating the network alarm with the customer connectivity that is affected by the network alarm;
    updating a status of the customer connectivity that is affected by the network alarm on a graphical map that displays all customer connectivities, wherein the customer connectivities comprise internet protocol-permanent virtual circuits between a customer edge router and a provider edge router;
    displaying the graphical map to a customer;
    receiving a request from the customer for the status of the customer connectivity that was updated, wherein the customer clicks on a portion of the graphical map associated with the customer connectivity that was updated; and
    providing the status of the customer connectivity to the customer.

2. The method of claim 1, wherein the status of the customer connectivity is provided to the customer on a per virtual private network basis.

3. The method of claim 1, wherein the status of the customer connectivity is provided to the customer on a customer edge device to provider edge device pair basis.

4. The method of claim 1, wherein the status of the customer connectivity is provided to the customer on a per location basis.

5. The method of claim 1, wherein the updating the status of the customer connectivity that is affected by the network alarm comprises updating a customer homepage.

6. The method of claim 1, wherein the updating the status of the customer connectivity comprises a status of all end-to-end transport layers associated with the customer connectivity.

7. A computer-readable medium having stored thereon a plurality of instructions, the plurality of instructions including instructions which, when executed by a processor, cause the processor to perform a method for maintaining a status of a customer connectivity, comprising:
    monitoring a plurality of network components, wherein a customer connectivity is supported by the plurality of network components;
    receiving a network alarm for a network component of the plurality of network components;
    correlating the network alarm with the customer connectivity that is affected by the network alarm;
    updating a status of the customer connectivity that is affected by the network alarm on a graphical map that displays all customer connectivities, wherein the customer connectivities comprise internet protocol-permanent virtual circuits between a customer edge router and a provider edge router;
    displaying the graphical map to a customer;
    receiving a request from the customer for the status of the customer connectivity that was updated, wherein the customer clicks on a portion of the graphical map associated with the customer connectivity that was updated; and
    providing the status of the customer connectivity to the customer.

8. The computer-readable medium of claim 7, wherein the status of the customer connectivity is provided to the customer on a per virtual private network basis.

9. The computer-readable medium of claim 7, wherein the updating the status of the customer connectivity that is affected by the network alarm comprises updating a customer homepage.

10. The computer-readable medium of claim 7, wherein the status of the customer connectivity comprises a status of all end-to-end transport layers associated with the customer connectivity.

11. The computer-readable medium of claim 7, wherein the status of the customer connectivity is provided to the customer on a customer edge device to provider edge device pair basis.

12. The computer-readable medium of claim 7, wherein the status of the customer connectivity is provided to the customer on a per location basis.

13. An apparatus for maintaining a status of a customer connectivity, comprising:
    means for monitoring a plurality of network components, wherein a customer connectivity is supported by the plurality of network components;
    means for receiving a network alarm for a network component of the plurality of network components;
    means for correlating the network alarm with the customer connectivity that is affected by the network alarm;
    means for updating a status of the customer connectivity that is affected by the network alarm on a graphical map that displays all customer connectivities, wherein the customer connectivities comprise internet protocol-permanent virtual circuits between a customer edge router and a provider edge router;
    means for displaying the graphical map to a customer;
    means for receiving a request from the customer for the status of the customer connectivity that was updated, wherein the customer clicks on a portion of the graphical map associated with the customer connectivity that was updated; and means for providing the status of the customer connectivity to the customer.

14. The apparatus of claim 13, wherein the status of the customer connectivity comprises a status of all end-to-end transport layers associated with the customer connectivity.

15. The apparatus of claim 13, wherein the status of the customer connectivity is provided to the customer on a per virtual private network basis.

16. The apparatus of claim 13, wherein the status of customer connectivity is provided to the customer on a customer edge device to provider edge device pair basis.

17. The apparatus of claim 13, wherein the status of the customer connectivity is provided to the customer on a per location basis.

18. The apparatus of claim 13, wherein the updating the status of the customer connectivity that is affected by the network alarm comprises updating a customer homepage.

* * * * *